(12) United States Patent
Bastian et al.

(10) Patent No.: US 7,393,036 B2
(45) Date of Patent: Jul. 1, 2008

(54) SLIDE OUT CARGO FLOOR

(75) Inventors: Timothy L Bastian, New Hudson, MI (US); Alan Kirby, Livonia, MI (US); Paul Borden, Brighton, MI (US)

(73) Assignee: Chrysler LLC, Auburn Hills, MI (US)

( * ) Notice: Subject to any disclaimer, the term of this patent is extended or adjusted under 35 U.S.C. 154(b) by 173 days.

(21) Appl. No.: 11/073,441

(22) Filed: Mar. 7, 2005

(65) Prior Publication Data

US 2006/0197351 A1 Sep. 7, 2006

(51) Int. Cl.
*B62D 33/08* (2006.01)
(52) U.S. Cl. .................... 296/26.09; 296/26.1
(58) Field of Classification Search .............. 296/26.09, 296/26.1, 37.6, 26.01, 26.13, 65.14, 65.15; 414/522; 108/44; 312/334.32, 334.33
See application file for complete search history.

(56) References Cited

U.S. PATENT DOCUMENTS

| | | | |
|---|---|---|---|
| 5,513,941 A * | 5/1996 | Kulas et al. ................. 414/522 |
| 6,039,421 A * | 3/2000 | Fulterer ...................... 312/333 |
| 6,120,075 A | 9/2000 | Terry | |
| 6,464,274 B2 | 10/2002 | Mink et al. | |
| 6,503,036 B1 | 1/2003 | Bequette et al. | |
| 6,709,038 B2 | 3/2004 | Bienert et al. | |
| 7,121,603 B2 * | 10/2006 | Stevenson et al. ........ 296/26.09 |

* cited by examiner

*Primary Examiner*—Joseph D Pape
(74) *Attorney, Agent, or Firm*—Ralph E. Smith

(57) ABSTRACT

A floor assembly for a cargo space of an automotive vehicle includes a floor support adapted to be mounted in the cargo space. A floor panel is mounted on the floor support for movement along a predetermined path of travel from a first position totally within the cargo space to an extended position at least partially outside the vehicle. Locking mechanism releasably locks the floor panel in the desired position. The locking mechanism may also be capable of locking the floor panel in several intermediate positions between the first position and the extended position. The locking mechanism preferably includes locking detents in spaced apart relation along the path of travel, and a locking lever engageable with any one of the detents to lock the floor panel in a selected position.

10 Claims, 4 Drawing Sheets

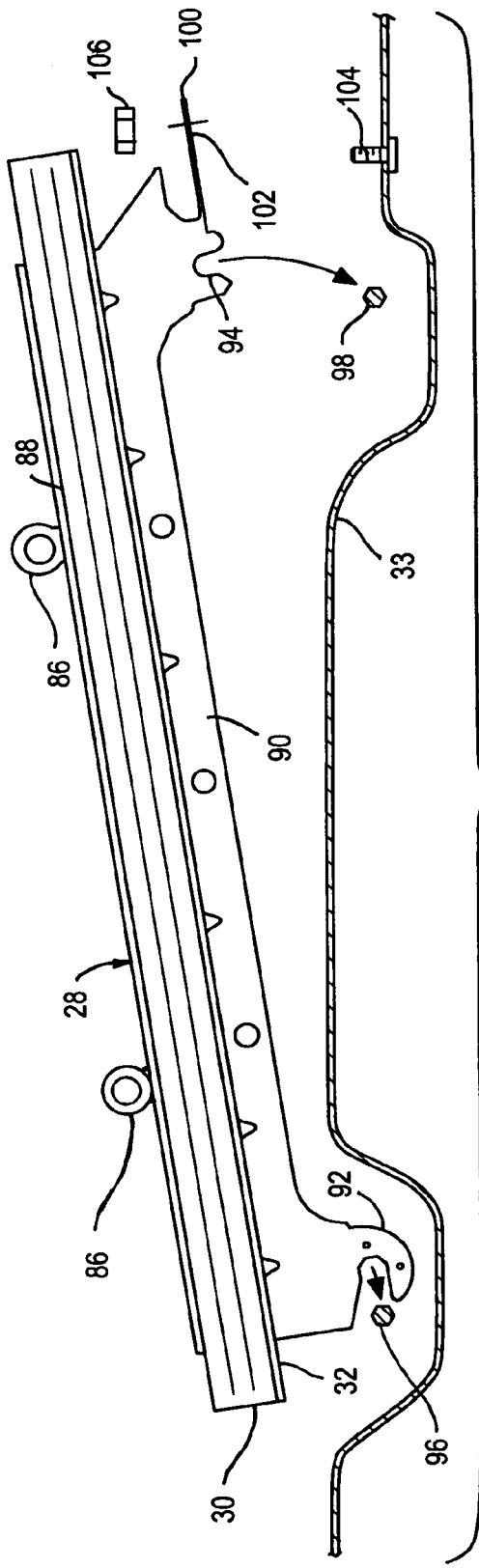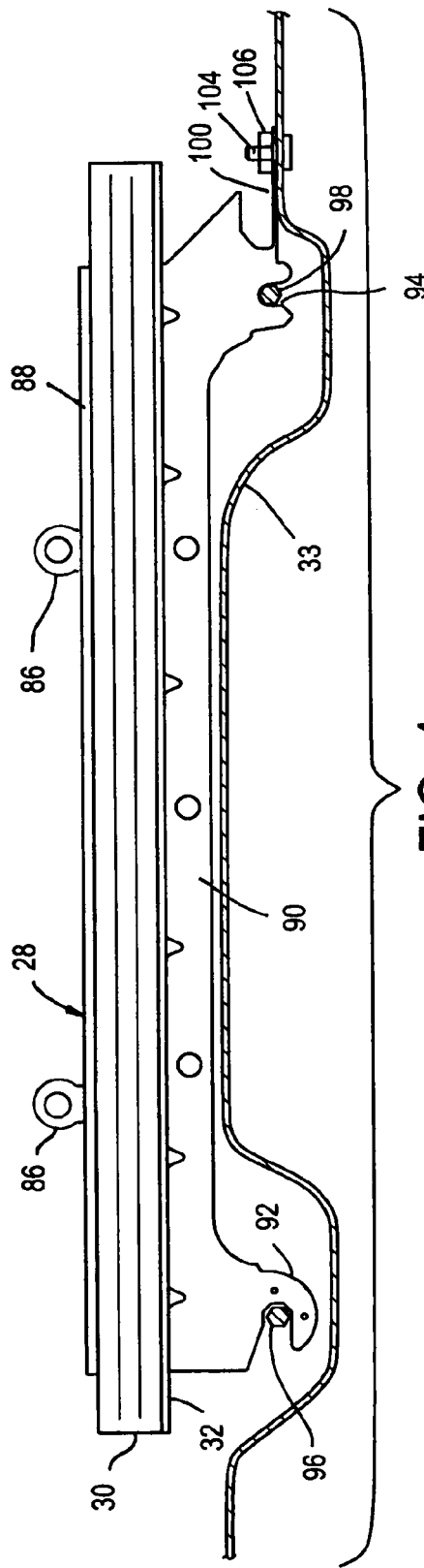

SLIDE OUT CARGO FLOOR

FIELD OF THE INVENTION

The present invention relates generally to a floor assembly for the cargo space of an automotive vehicle, and more particularly to a floor assembly having a slide out floor.

BACKGROUND OF THE INVENTION

Loading and unloading the cargo space of an automotive vehicle is difficult because the person doing the loading and/or unloading must reach into the cargo space while standing outside the vehicle. It is even more difficult if the closure for the opening to the cargo space through which articles are loaded or unloaded includes a transom pivoted to the lower edge of the opening that opens outwardly to a horizontal position for article transfer. What is needed is a floor assembly for the cargo space which facilitates loading and unloading.

SUMMARY OF THE INVENTION

In accordance with the present invention, the floor assembly includes a floor panel mounted in the cargo space on a floor support for movement along a predetermined path of travel from a first or forward position totally within the cargo space to an extended position. Preferably a locking mechanism is provided for selectively, releasably locking the floor panel in both the forward position and the extended position. It is also preferred that the locking mechanism be capable of locking the floor panel in a plurality of intermediate positions between the forward position and the extended position. For convenience, anchors may be provided to receive straps for tying down articles on the floor panel.

In the embodiment about to be described, the locking mechanism includes detents spaced apart along the path of travel, and a locking lever engageable with any one of the detents to lock the floor panel in a selected one of its positions. A release mechanism is provided to retract the locking lever out of engagement with a detent.

One object of the invention is to provide a floor assembly for cargo space of an automotive vehicle having one or more of the foregoing features and capabilities.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a view taken on the line 3-3 in FIG. 1, but showing the floor assembly detached from the underlying body structure;

FIG. 4 is a view similar to FIG. 3, but showing the floor assembly attached to the underlying body structure;

DETAILED DESCRIPTION OF THE PREFERRED EMBODIMENT

The following description of the preferred embodiment is merely exemplary in nature and is in no way intended to limit the invention, its application, or uses.

Figure 1:
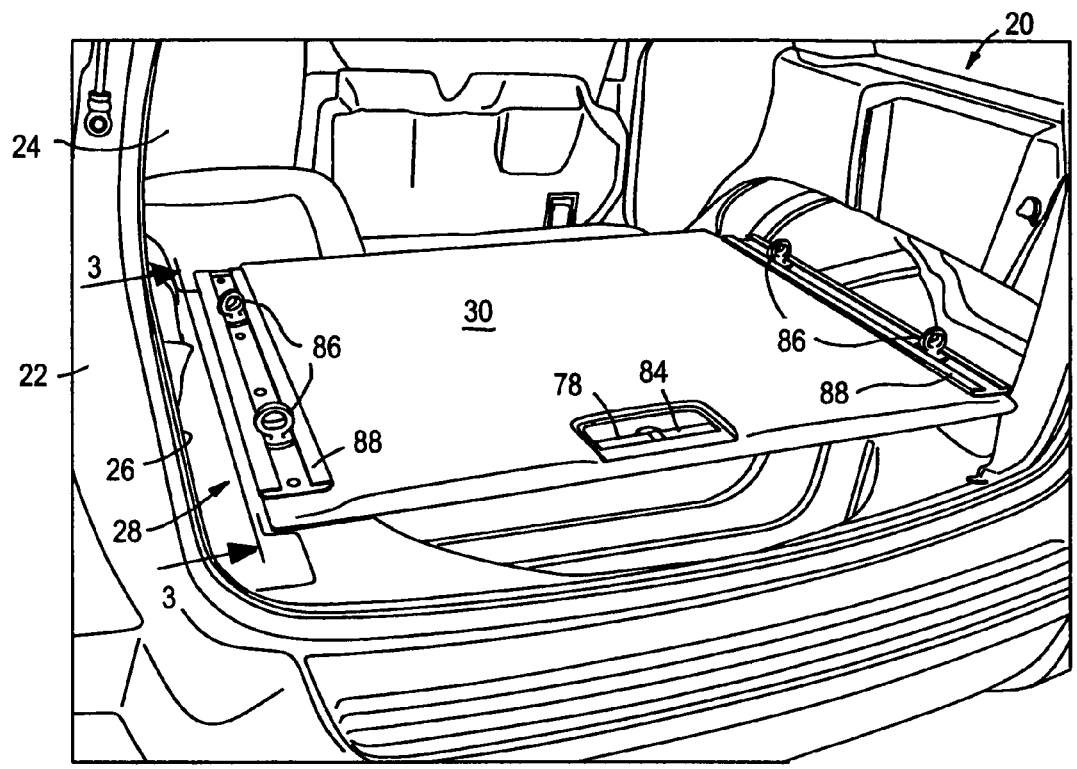
FIG. 1 is a perspective view of the rear end of an automotive vehicle having a floor assembly in the cargo space constructed in accordance with this invention, with the floor panel of the floor assembly disposed in a position entirely within the cargo space.
Figure 2:
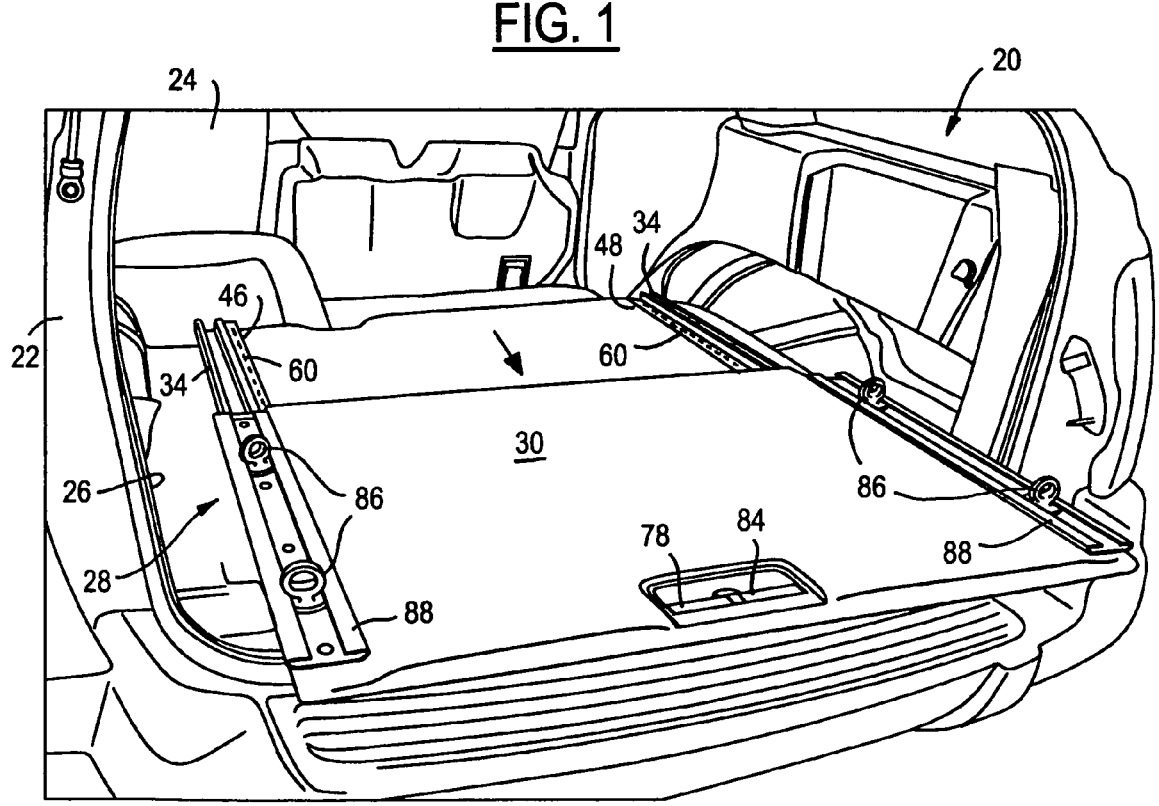
FIG. 2 is a perspective view similar to FIG. 1, but showing the floor panel of the floor assembly in an extended position.
Figure 5:
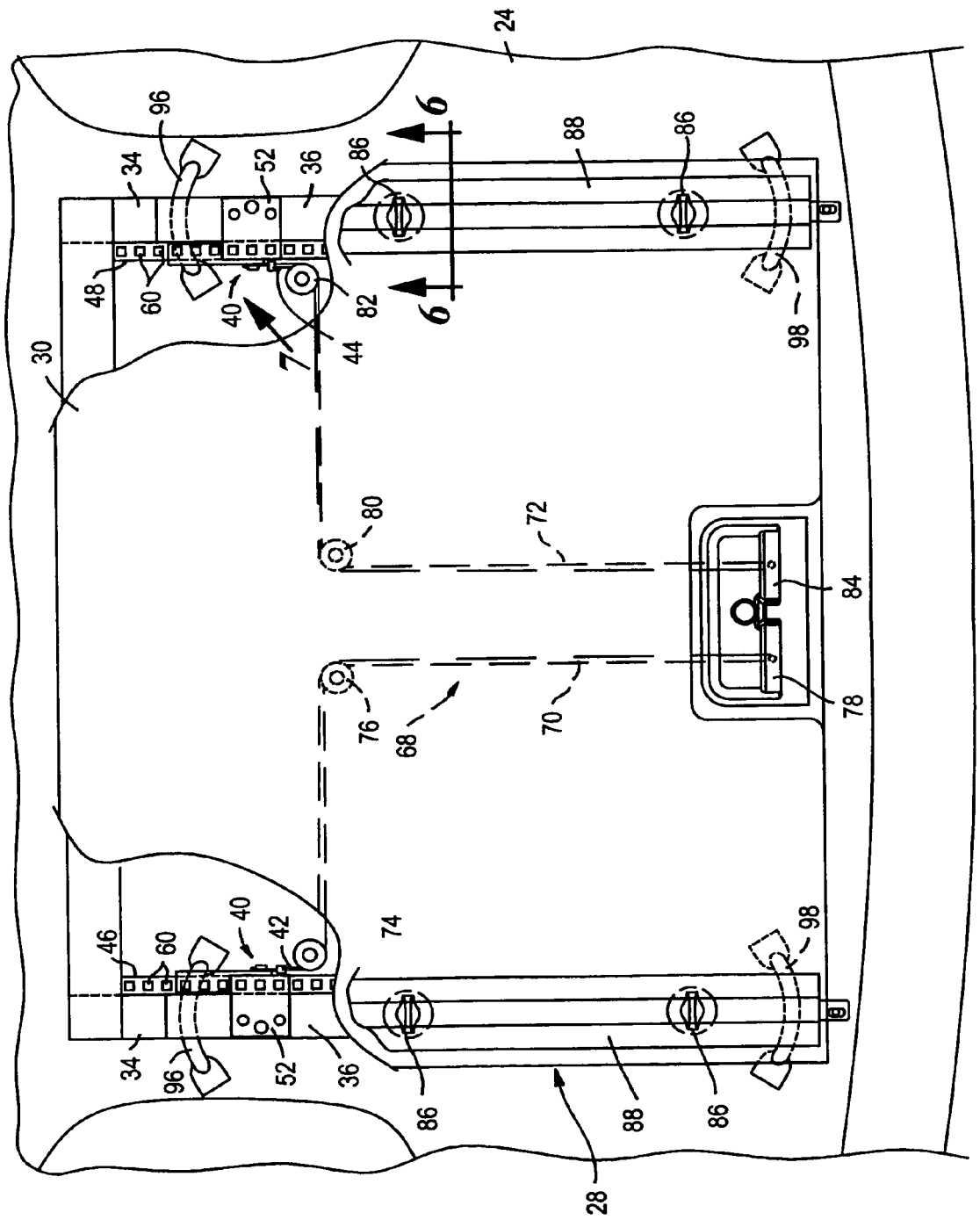
FIG. 5 is a fragmentary plan view of the floor assembly, with parts broken away.

Referring now more particularly to the drawings, and especially to FIGS. 1 and 2, there is shown an automotive vehicle 20 having a vehicle body 22 provided with a cargo space 24 having a rear opening 26. The rear opening 26 is normally closed by a suitable closure having a door or doors, and sometimes including a transom hinged to a lower edge portion of the opening 26. The closure, however, forms no part of the invention and is not shown in the drawings.

The cargo space 24 has a floor assembly 28 which includes a generally horizontal floor panel 30 mounted on a floor support 32. See FIGS. 2-6. The floor support 32 is mounted in fixed position on a rigid body panel 33 of the vehicle body 22. More specifically, the floor support 32 has laterally spaced apart longitudinally extending side rails 34. The floor panel 30 has laterally spaced apart side rails 36 which are secured to the underside of the floor panel and which respectively overlie the side rails 34. Ball bearings 38 (FIG. 6) support the side rails 36 of the floor panel 30 on the side rails 34 of the floor support for sliding movement of the floor panel lengthwise of the vehicle along a predetermined path of travel from the normal forward position entirely within the cargo space 24 as shown in FIG. 1 to a rearwardly extending position or positions shown in FIG. 2 in which at least the rear portion of the floor panel projects outside of the cargo space 24 and outside of the vehicle.

Figure 6:
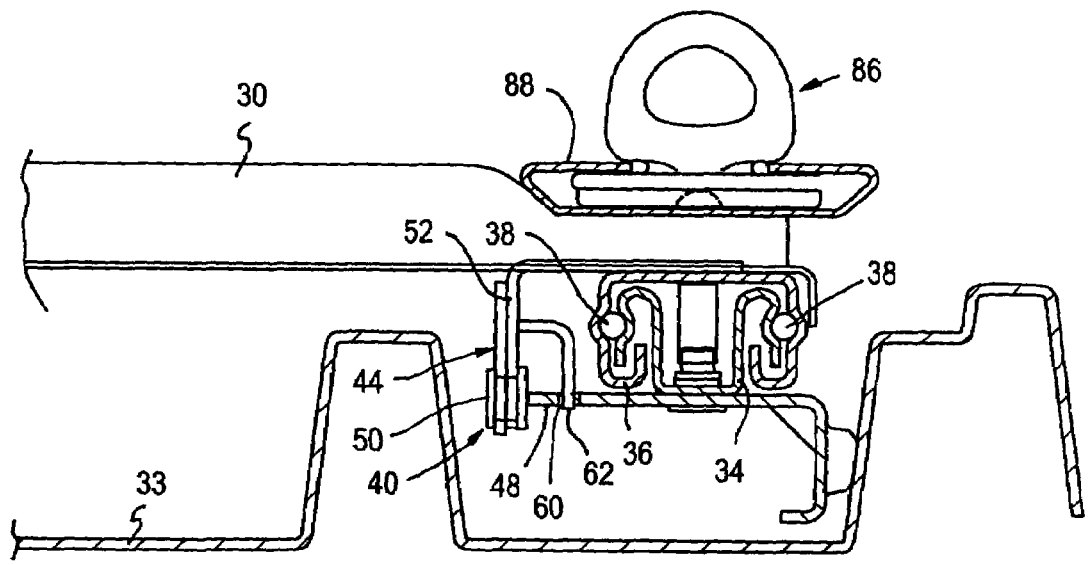
FIG. 6 is a sectional view taken on the line 6-6 in FIG. 5.

FIG. 6 shows the configuration of one of the side rails 34 and one of the side rails 36 and the sliding support for the side rail 36. It will be understood that the configuration of the other of the side rails 34 and the other of the side rails 36 and the sliding support therefor will be the same as in FIG. 6.

Figure 7:
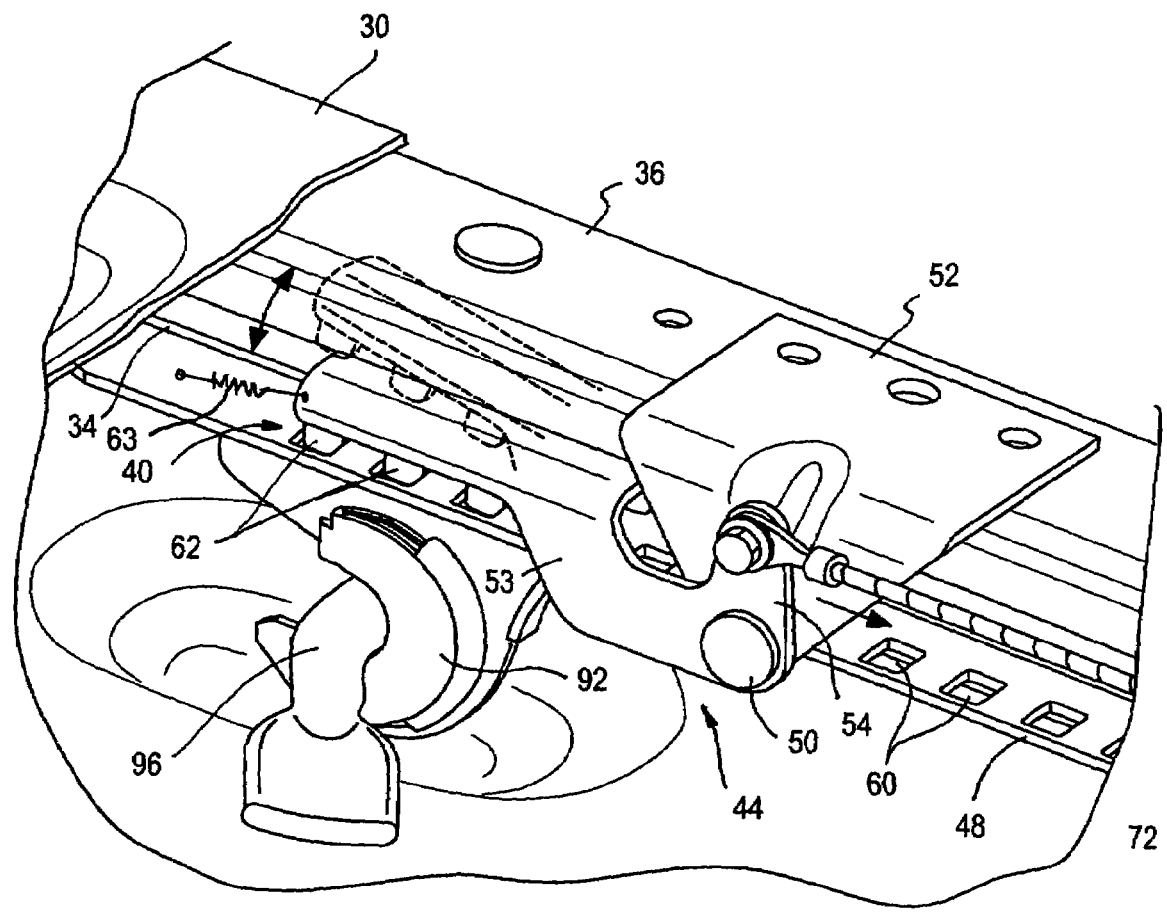
FIG. 7 is an enlarged fragmentary view looking in the direction of the arrow 7 in FIG. 5.

Locking mechanism 40 (FIGS. 5-7) is provided for locking the floor panel 30 in various positions, including a forward position wholly within the vehicle, a fully rearwardly extended position in which at least a substantial portion of the floor panel 30 is projected outside the cargo space 24 and outside the vehicle, and numerous intermediate positions between the forward position and the fully extended position.

The locking mechanism 40 comprises locking levers 42 and 44 carried by the floor panel 30, and locking strips 46 and 48 carried by the floor support 32. More specifically, each of the locking levers 42, 44 is pivotally mounted on a pivot pin 50 carried by a bracket 52 attached to one of the side rails 36 of the floor panel 30 (see FIG. 7). Each locking lever is generally L-shaped, and has angularly related arms 53 and 54 extending outwardly from the pivot pin 50. The locking strips 46 and 48 are rigidly attached to the respective support rails 34 and extend parallel to one another and parallel to the path of travel of the floor panel 30. Each locking strip 46, 48 has a plurality of locking holes or detents 60 equally spaced apart along its length.

The locking lever 42 overlies the locking strip 46 and the locking lever 44 overlies the locking strip 48. Each locking lever has locking dogs 62 on its arm 53 spaced apart the same distance as the detents 60 and adapted to engage in two or more of the detents 60 of the underlying locking strip. A tension spring 63 has one end connected to the arm 53 of each locking lever and the opposite end connected to the underlying locking strip. The springs 63 pull the locking levers in a downward direction toward the locking strips for engagement of the dogs in the detents, thereby locking the floor panel in a desired position.

Release mechanism 68 including cables 70 and 72 is provided to retract the locking levers 42 and 44 to withdraw the dogs 62 from the detents 60 and permit the position of the floor panel to be changed. The cable 70 has one end connected to the arm 54 of the locking lever 42, extends around pulleys 74 and 76 on the floor support 32 and has its opposite end attached to an operator 78 pivoted to the floor panel 30. The cable 72 has one end connected to the arm 54 of the locking lever 44, extends around pulleys 80 and 82 on the floor support 32 and has its opposite end attached to an operator 84 pivoted to the floor panel 30. The operators 78 and 84 may be actuated to pull on the cables 70 and 72 to pivot the locking levers in a direction to withdraw the dogs 62 from the detents 60. The operators 78 and 84 are conveniently located at the rear edge of the floor panel. A person may thus easily adjust the position of the floor panel 30 while standing outside the vehicle. Instead of separate operators for each cable, both cables can be attached to a single operator.

Anchors 86 are slidably mounted in longitudinally extending channels 88 secured in laterally spaced apart relation to the upper surface of the floor panel 30. Each anchor 86 may be in the form of an eye bolt. Straps, not shown, may be threaded through the eye bolts to tie down articles loaded onto the top surface of the floor panel.

The entire floor assembly 28 is removably mounted on the supporting body panel 33 of the vehicle body 22. Each side rail 34 of the floor support 32 has an elongated mounting bracket 90 having a forwardly opening hook 92 at the front end and a downwardly opening slot 94 at the rear end (see FIGS. 3 and 4). The hooks 92 are transversely aligned and each hook is adapted to engage a retainer 96 secured to the body panel 33. The slots 94 are transversely aligned and each slot is adapted to engage a retainer 98 secured to the body panel 33. Each mounting bracket 90 has a rearwardly extending projection 100 provided with a hole 102 to receive a bolt 104. To secure the floor assembly in position on the floor panel 33 of the vehicle body, the floor assembly is lowered from the position of FIG. 3 to the position of FIG. 4, the bolts 104 are extended through the holes 102, and nuts 106 are applied to the bolts.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A floor assembly for a cargo space of an automotive vehicle comprising:
   a floor support adapted to be mounted on a body panel of the vehicle in the cargo space, and including laterally spaced apart longitudinally extending rails with mounting brackets having a forwardly opening hook at a front end and a downwardly opening slot at a rear end, wherein the hooks and slots are engageable to retainers secured to the body panel,
   a floor panel mounted on the floor support for movement along a predetermined path of travel from a first position totally within the cargo space to an extended position spaced from the first position, and
   a locking mechanism for selectively releasably locking the floor panel in the first position and in the extended position.

2. The floor assembly of claim 1, wherein said floor panel in said extended position extends outside of the cargo space.

3. The floor assembly of claim 2, further including an opening to the cargo space in a rear portion of the vehicle, said path of travel extends rearwardly of tho vehicle, said floor panel in said extended position extends through the opening with at least a rear portion of the floor panel extending rearwardly outside the vehicle.

4. The floor assembly of claim 1, wherein said locking mechanism is capable of locking the floor panel in a plurality of intermediate positions between the first position and the extended position.

5. A floor assembly for a cargo space of an automotive vehicle comprising:
   a floor support adapted to be mounted in the cargo space;
   a floor panel mounted on the floor support for movement along a predetermined path of travel from a first position totally within the cargo space to an extended position spaced from the first position;
   a locking mechanism for selectively releasably locking the floor panel in the first position and in the extended position, wherein the locking mechanism is capable of locking the floor panel in a plurality of intermediate positions between the first position and the extended position, wherein the locking mechanism comprises:
      laterally spaced apart elongated first and second locking strips mounted to the floor support and extending lengthwise of the path of travel, with a plurality of detents in spaced apart relation along the path of travel in each of the locking strips;
      first and second locking levers carried by the floor panel adjacent to the respective first and second locking strips, with locking dogs on the locking levers for engagement with the detents to lock the floor panel in a selected one of the positions;
      pivots mounting the first and second locking levers on the floor panel for pivotal movement in a direction enabling the locking dogs to engage in the detents in the respective first and second locking strips to lock the floor panel in a selected one of the positions; and
      springs for urging the locking levers in a direction toward the locking strips for engagement of the locking dogs with the detents; and
   a release mechanism for retracting the respective first and second locking levers out of engagement with the detents, wherein the release mechanism includes:
      first and second cables attached to the respective first and second locking levers, the first and second cables being retractable to retract the first and second locking levers; and
      first and second operators on the floor panel attached to the respective first and second cables to retract the cables;
   wherein the locking levers are generally L-shaped, having angularly related arms extending outwardly from the pivot thereof one of the arms of each of the locking levers carrying the locking dogs, another arm of the first locking lever being attached to the first cable and another arm of the second locking lever being attached to the second cable.

6. The floor assembly of claim 5, wherein the floor panel in the extended position extends outside of the cargo space.

7. The floor assembly of claim 6, further including an opening to the cargo space in a rear portion of the vehicle, the path of travel extends rearwardly of the vehicle, the floor panel in the extended position extends through the opening with at least a rear portion of the floor panel extending rearwardly outside the vehicle, and the operators being located at the rear of the floor panel.

8. The floor assembly of claim 7, further including anchors for tying down articles on the floor panel, and channels on the floor panel for slidably supporting the anchors in adjusted positions.

9. A floor assembly for a cargo space of an automotive vehicle comprising:
- a floor support adapted to be mounted in the cargo space;
- a floor panel mounted on the floor support for movement along a predetermined path of travel from a first position totally within the cargo space to an extended position spaced from the first position;
- a locking mechanism for selectively releasably locking the floor panel in the first position and in the extended position, wherein the locking mechanism is capable of locking the floor panel in a plurality of intermediate positions between the first position and the extended position, wherein the locking mechanism comprises:
  - at least one locking strip carried by the floor support, extending lengthwise of the path of travel, and having a plurality of detents in spaced apart relation along the path of travel;
  - at least one locking lever carried by the floor panel about a pivot and having angularly related arms extending outwardly from the pivot including a first arm, and a second arm carrying at least one dog to engage the detents to lock the floor panel in the first, extended, and intermediate positions;
  - at least one spring to urge the locking lever in a direction toward the locking strip for engagement of the at least one dog with the detents; and
- a release mechanism for retracting the at least one locking lever to permit the floor panel to slide, and including:
  - at least one pulley cried by the floor panel;
  - at least one cable extending at least partially around the at least one pulley and being connected to the first arm of the at least one locking lever; and
  - at least one operator connected to the cable and actuatable to pull the cable and pivot the at least one locking lever in a direction to withdraw the at least one dog from the detents.

10. The floor assembly of claim 9, further comprising anchors carried on the floor panel for tying down articles on the floor panel.

* * * * *